Patented Sept. 11, 1928.

1,684,275

UNITED STATES PATENT OFFICE.

ERWIN HOFFA AND ERICH FISCHER, OF HOCHST-ON-THE-MAIN, GERMANY, ASSIGNORS TO GRASSELLI DYESTUFF CORPORATION, OF NEW YORK, N. Y., A CORPORATION OF DELAWARE.

AZO DYE AND PROCESS FOR PREPARING THE SAME.

No Drawing. Application filed July 27, 1926, Serial No. 125,326, and in Germany August 1, 1925.

Our present invention relates to the preparation of azo-dyes.

We have found that by causing a 4-nitro-2-diazobenzene-1-carboxylic acid ester to act upon a compound of the general formula

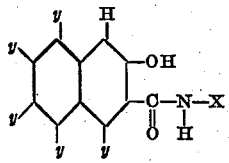

wherein X represents a monovalent substituent of the group hydrogen, alkyl-, aryl-, and aralkyl-, and $y$ represents any monovalent substituent azo dyes of great value are produced. They are essentially suitable as pigment dyes. They are superior to the other dyes of this class by the brightness of the tints they give and by their excellent fastness to light.

The dyestuffs may be prepared in substance on the fibre or on a substratum.

The following example illustrates our invention, but is not intended to limit it thereto; the parts being by weight.

196 parts of 4-nitro-2-amino-1-benzoic acid methylester are triturated with a solution of 69 parts of sodium nitrite in 300 parts of water and the mass is then diazotized at 5–10° C. by introducing it into a mixture of 300 parts of hydrochloric acid of 20° Bé. and 1000 parts of water. The diazo solution, after being clarified by filtration, is run into a suspension prepared as follows:

263 parts of 2-hydroxy-naphthalene-3-carboxylic acid anilide to which 50 parts of Turkey-red oil have been added, are dissolved in 195 parts of caustic soda solution of 40° Bé. and about 1200 parts of water. This solution is entered into 100 parts of acetic acid and 2000 parts of ice-water, whereby the anilide separates. It is advantageous to accelerate the coupling-process by adding sodium acetate. After having stirred the mass for two hours, it is filtered by suction and washed.

The coupling process may be carried out in presence of a substratum. The pigment thus obtained gives a bluish-red color and can be used for instance for coloring wall-paper and variegated paper, the tints produced being of an excellent purity and fastness to light.

We claim:

1. Process for preparing azo dyes, which comprises coupling an ester of a 4-nitro-2-diazobenzene-1-carboxylic acid with a compound of the general formula

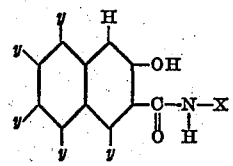

wherein X represents a monovalent substituent of the group hydrogen, alkyl-, aryl-, and aralkyl-, and $y$ represents any monovalent substituent.

2. Process for preparing azo-dyes, which comprises coupling 4-nitro-2-diazobenzene-1-carboxylic acid methylester with 2-hydroxynaphthalene-3-carboxylic acid anilide.

3. As new products, the azo dyes of the following composition

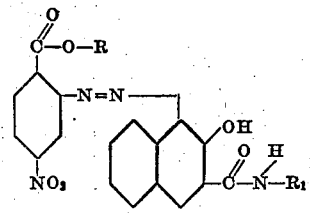

wherein R represents the residue of an aliphatic or aromatic alcohol, $R_1$ = hydrogen, an alkyl-, aryl- or aralkyl-residue.

4. As a new product, the azo dye of the following composition

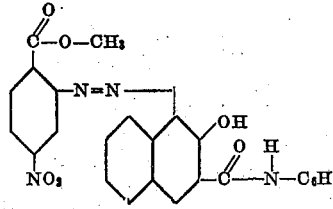

5. Materials dyed with the azo dyestuffs defined in claim 3.

6. Material dyed with the azo dyestuff defined in claim 4.

In testimony whereof, we affix our signatures.

ERWIN HOFFA.
ERICH FISCHER.